United States Patent [19]

Brumme et al.

[11] Patent Number: 4,703,490
[45] Date of Patent: Oct. 27, 1987

[54] TRANSVERSELY EXCITED GAS LASER AND METHOD FOR THE OPERATION THEREOF

[75] Inventors: Gerhard Brumme, Eching; Konrad Paur, Ottobrunn, both of Fed. Rep. of Germany

[73] Assignee: Siemens Aktiengesellschaft, Berlin and Munich, Fed. Rep. of Germany

[21] Appl. No.: 787,070

[22] Filed: Oct. 15, 1985

[30] Foreign Application Priority Data

Oct. 15, 1984 [DE] Fed. Rep. of Germany ....... 3437738

[51] Int. Cl.⁴ ............................................. H01S 3/097
[52] U.S. Cl. ........................................ 372/86; 372/82; 372/83
[58] Field of Search ......................... 372/82, 83, 86, 87

[56] References Cited

U.S. PATENT DOCUMENTS 4,613,971  9/1986  Brumme et al. ..................... 372/87

FOREIGN PATENT DOCUMENTS 3313811  10/1984  Fed. Rep. of Germany .

OTHER PUBLICATIONS

M. Grodel et al. "Effect of Peaking Capacitor on the Discharge Charac . . . " 13 Optical and Quantum Electronics, 251–253 (1981).
M. Giorgi et al. "High Efficiency, Medium Repetition Rate . . . " 15 Optical and Quantum Electronics, 185–186 (1983).

Primary Examiner—Gene Wan
Attorney, Agent, or Firm—Hill, Van Santen, Steadman & Simpson

[57] ABSTRACT

A transversally excited gas laser whose main discharge is initiated by a corona discharge triggered between auxiliary electrodes. The auxiliary electrodes are thereby respectively composed of a conductor which is enveloped by a jacket of dielectric which forms a single part. The jacket is provided with an incision between the two conductors parallel to the longitudinal axis, facing the main discharge path, and also is metallized at its outside. The incision projects UV light of the corona discharge into the region of the main discharge path and thus generates free electrons where they are most effective. The outside metallization increases the capacitance of the auxiliary electrode arrangement; and as a result, the corona discharge is intensified. The main discharge may possibly also be delayed such that the firing ensues in a more greatly ionized gas. The result is that the laser becomes more independent of changes in the high voltage, the gas pressure and the gas composition and thus may be used in sealed-off $CO_2$ lasers for mobile employment.

15 Claims, 2 Drawing Figures

TRANSVERSELY EXCITED GAS LASER AND METHOD FOR THE OPERATION THEREOF

BACKGROUND OF THE INVENTION

1. Field of the Invention

The present invention relates generally to a transversely excited (TE) gas laser and more particularly, to a TE laser having auxiliary electrodes such that a corona discharge pre-ionizes the gas in a main discharge space.

2. Description of the Prior Art

In a transverse excited gas laser, the use of a so-called "peaking capacitor" in parallel to the main discharge path is known. When the peaking capacitor is correctly dimensioned, the addition of this capacitor can often considerably improve the stability and the uniformity of the main discharge. In this regard, see a "Short Communication" by M. Grodel et al, 13 Opt. Quant. Elec. 251 (1981).

The employment of a peaking capacitor provides no improvements whatsoever in TE gas layers having pre-ionization sources, as tests have shown. The reasons for this behavior, as reported in a "Short Communication" by M. Giorgi, Opt. Quant. Elec. 15 (1983) 185, are not yet clear.

SUMMARY OF THE INVENTION

It is an object to the present invention to provide a TE $CO_2$ laser that can be operated over longer times with a sealed-off gas volume and, in particular, can also stand relatively strong high voltage fluctuations. This object is inventively achieved by a laser having the features of patent claim 1.

This and other objects of the present invention are embodied in a transversely excited gas laser having an elongated gas filled discharge chamber with two main electrodes placed in the chamber extending along the optical axis thereof. Two auxiliary electrodes are provided parallel with the optical axis of the discharge chamber and are formed of a conductor surrounded by a common dielectric jacket having a spark gap. The dielectric jacket is shaped to define constrictions which shape the corona discharge so that UV light is emitted into the space between the main electrodes. In this way, the degree of ionization of the gas is particularly high precisely where the presence of free electrons is most effective. It has turned out that this simple measure already significantly improves the functionability of the laser.

The operation is further improved when the capacitance of the auxiliary electrode arrangement is also correctly set. The optimum value is usually somewhat greater than that capacitance which is formed by the dielectrically enveloped conductors themselves. Accordingly, not only is the conductor within the dielectric jacket but also the dielectric jacket will normally be metallized at its outside, namely at locations at which the metallization has only a capacitance-increasing effect and is not involved in a discharge.

Given optimized auxiliary electrode capacitances, a $CO_2$ laser, for example easily tolerates high voltage changes of up to ±15%. There is still no satisfactory explanation of this noteworthy phenomenon. It can probably not be excluded that mechanisms similar to those in the otherwise employed "peaking capacitor" play a part; however, the respectively most favorable values of capacitance in the two cases usually lie apart by more than an order of magnitude.

DESCRIPTION OF THE PREFERRED EMBODIMENTS

Figure 1:
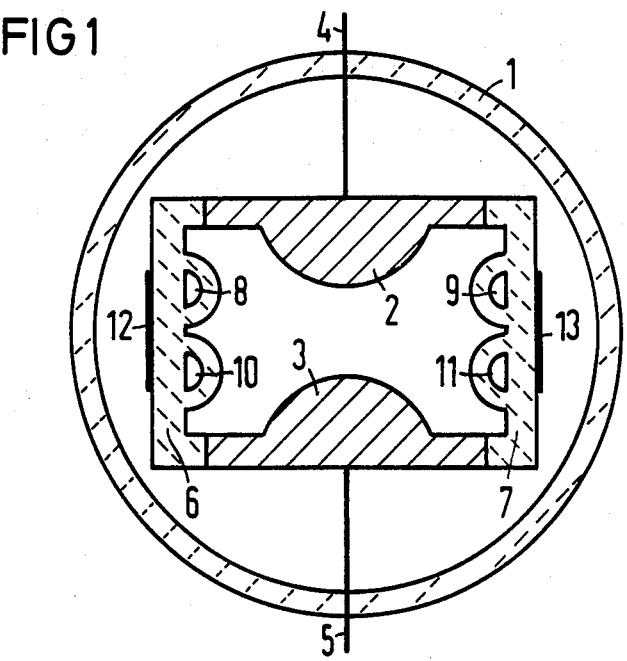
FIG. 1 shows a schematic cross-section of a preferred embodiment of the device of the present invention.

FIG. 1 shows a pulsed TE gas laser in cross-section. The laser includes a cylindrical ceramic tube 1 in which an electrode arrangement is disposed. The electrode arrangement is a self-supporting unit and has the overall shape of an elongated cuboid having a rectangular cross-section. Two opposite long sides of the electrode arrangement are formed by the main electrodes, comprising the main cathode 2 and the main anode 3. Power is supplied to the main electrodes 2 and 3 by their respective leads 4 and 5.

An auxiliary electrode pair is integrated in the electrode arrangement at the two remaining opposite long sides. The end of faces of the cuboid are closed by plates including mirrors (not shown) which completes the resonance chamber of the TE laser.

Each of the auxiliary electrodes includes a shaped ceramic member 6 and 7. The upper and lower edges of the auxiliary electrode members 6 and 7 are angled inwardly and secured to the main electrodes 2 and 3, respectively.

The body of the dielectric auxiliary electrodes 6 and 7 includes web portions forming a "B" profile. The interior cavities of the B-shaped web are metallized at 8, 9, 10 and 11. The back sides of the B-shaped web on the external surface of the auxiliary electrodes 6 and 7 are likewise metallized at 12 and 13, respectively. The metallized cavities 8 and 9 are proximate the main cathode 2 and serve as auxiliary cathodes, while the metallized cavities 10 and 11 are proximate the main anode 3 and serve as auxiliary anodes. The metallized external surface portions 12 and 13 provide increased capacitance.

Figure 2:
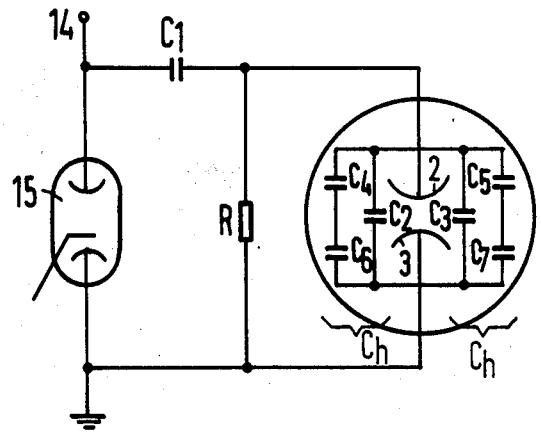
FIG. 2 shows an operating circuit for the device of FIG. 1.

FIG. 2 shows a simple operating circuit for the TE laser of FIG. 1. A triggerable spark gap 15, serving as a switch, is connected between a high voltage source connection 14 and ground. A storage capacitor C1 and a resistor R are connected in parallel with the spark gap 15. The main discharge path of the TE laser is connected in parallel with the resistor R.

The auxiliary electrodes are shown schematically as the capacitances which they generate. Capacitance C2 is generated by the metallized portions 8 and 10; capacitance C3 is generated by the metallized portions 9 and 11; capacitance C4 is generated by the metallized portions 8 and 12; capacitance C5 is generated by the metallized portions 9 and 13; capacitance C6 is generated by the portions 10 and 12; and capacitance C7 is generated by the portions 11 and 13.

In a preferred embodiment, the circuit of FIG. 2 is provided a voltage at 14 of 26(+3)kV. The storage capacitor C1 is of a value of 10 nF, the resistor R has a value of 10k $\Omega$, and each of the capacitances built of the capacitances $C_2$, $C_4$, $C_6$ or $C_3$, $C_5$, $C_7$ respectively have a valve of approximately 40 pF.

The dielectric auxiliary electrodes may also be of other shapes than that of the preferred embodiment. The auxiliary electrodes may, for instance, be shaped to provide an "8" profile. Any number of shapes of auxiliary electrodes may be provided so long as the prescribed constrictions are included.

Other parameters of the TE laser may also be chosen to provide different operating characteristics, such as selecting a gas mixture to provide an especially high volume yield. For example, a $CO_2$ laser having a $CO_2$ content of at least 30% would be realizable.

The present TE laser having shaped auxiliary electrodes provides a shaped corona discharge of ultraviolet light emitted into the space between the main electrodes. The corona discharge provides ionization of the gas within the gas chamber at a location where the presence of the free electrons is most effective. This results in a gas laser which can be used for "sealed-off" operation making the present device more mobile in that the gas pressure, the gas composition, and the supply voltage are no longer critical. The main discharge may also be delayed so that it will occur after a greater amount is ionized.

It is apparent from the foregoing specification, that the invention is susceptible to being embodied with various alterations and modications which may differ particularly from those that we have described in the preceding specification and description. It should be understood that we wish to embody within the scope of the patent warranted hereon all changes and modifications as reasonably and properly come within the scope of our contribution to the art.

We claim as our invention:

1. A transversely excited gas laser containing an elongated, gas-filled discharge chamber having
   (a) two optical elements which are situated at two end faces of said chamber and lie on an optical axis,
   (b) first and second main electrodes disposed in said chamber extending along said optical axis, said optical axis proceeding in a main discharge space between said first and second main electrodes,
   a drive unit with which, during operation of the laser,
   (a) said first and second electrodes are applied to such different potentials that main electrical discharge occurs between them in a main discharge space;
   the improvement comprising:
   at least two auxiliary electrode pairs disposed in said chamber extending parallel to said optical axis; and
   a dielectric jacket surrounding said at least two auxiliary electrode pairs and common to two of said auxiliary electrodes and having a profile forming a channel-type constriction between said two auxiliary electrodes of every auxiliary electrode pair, said channel-type constriction facing said main discharge space to direct a shaped discharge into said main discharge space.

2. A laser according to claim 1, wherein said dielectric jacket of at least one of said auxiliary electrode pair has an "8" profile with said channel-type constriction between upper and lower portions of said "8".

3. A laser according to claim 1, wherein said dielectric jacket of at least one of said auxiliary electrode pair has a "B" profile with said channel-type constriction between upper and lower portions of said "B".

4. A laser according to claim 1, wherein each of said auxiliary electrodes is composed of a metallization layer covering an inside wall of an elongated cavity in said dielectric jacket.

5. A laser as claimed in claim 1, wherein said auxiliary electrode pairs each have a capacitance $C_h$ of between 30 pF. and 70 pF.

6. A laser according to claim 1, wherein a metallization layer is carried on an outside surface of said dielectric jacket facing away from said main discharge space to provide increased capacitance with said auxiliary electrode pair.

7. A laser according to claim 5 further comprising a storage capacitor having the capacitance $C_1$, and a capacitance $C_2$ defined as the capacitance formed by an auxiliary electrode pair, where $C_2$ is in the range $3 \times 10^{-3} C_1 < C_2 < 0.6 \times 10^{-2} C_1$.

8. A method for operating a TE gas laser, comprising:
   switching a high voltage source in a circuit of a TE gas laser;
   charging a storage capacitor in said circuit by said voltage source switching;
   pre-ionizing gas within said laser;
   projecting a shaped discharge of said pre-ionized gas into a main discharge path of said TE gas laser by an elongated constriction directed toward said main discharge path; and
   firing a main discharge in said main discharge path.

9. A transversely excited gas laser, comprising:
   an elongated gas-filled discharge chamber having an optical axis;
   two main electrodes mounted within said discharge chamber and extending substantially parallel to and on opposite sides of said optical axis;
   electrical conductors extending into said discharge chamber and connected to said two main electrodes;
   at least one auxiliary electrode pair disposed extending substantially parallel to and between said two main electrodes and laterally of said optical axis;
   a first dielectric jacket surrounding said auxiliary electrode pair and common to both electrodes of said auxiliary electrode pair, said first dielectric jacket defining a narrow channel-shaped constriction between said electrodes of said auxiliary electrode pair, said channel-shaped constriction opening toward said optical axis to emit a shaped corona discharge toward said optical axis between said two main electrodes.

10. A transversely excited gas laser as claimed in claim 9, further comprising:
    a metallized coating on an outside surface of said dielectric jacket at least opposite said channel-shaped constriction.

11. A transversely excited gas laser as claimed in claim 11, wherein said auxiliary electrode pair is formed by metallized layers on interior cavities of said dielectric jacket.

12. A transversely excited gas laser as claimed in claim 11, wherein said dielectric jacket includes first and second semicylindrical convex surfaces facing said optical axis, each of said semicylindrical surfaces having an axis coincident with respective ones of said auxiliary electrode pair, said first and second semicylindrical surfaces adjoining to form said channel-shaped constriction.

13. A transversely excited gas laser as claimed in claim 9, further comprising:
    a second auxiliary electrode pair disposed extending substantially parallel to and between said two main electrodes and laterally of said optical axis, said second auxiliary electrode pair being on an opposite side of said optical axis from said one auxiliary electrode pair; and a second dielectric jacket surrounding said second auxiliary electrode pair and common to both electrodes of said second auxiliary electrode pair, said dielectric jacket defining a second narrow channel-shaped constriction between said electrodes of said second auxiliary electrode pair, said second channel-shaped constriction opening toward said optical axis to emit a shaped corona discharge toward said optical axis between said two main electrodes.

14. A transversely excited gas laser as claimed in claim 12, wherein said first and second dielectric jackets each include shaped upper and lower edges adjoining respective ones of said two main electrodes to form an elongated enclosure about said optical axis and within said discharge chamber, said first and second dielectric jackets being free of walls defining said elongated discharge chamber.

15. A transversely excited gas laser as claimed in claim 14, wherein said elongated enclosure is an elongated cuboid.

* * * * *